US007929808B2

(12) United States Patent
Seaman et al.

(10) Patent No.: US 7,929,808 B2
(45) Date of Patent: Apr. 19, 2011

(54) SYSTEMS AND METHODS FOR GENERATING DIGITAL IMAGES HAVING IMAGE META-DATA COMBINED WITH THE IMAGE DATA

(75) Inventors: Mark D. Seaman, Greeley, CO (US); Gregory A. Brake, Fort Collins, CO (US); Robert D. Thompson, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2802 days.

(21) Appl. No.: 10/002,706

(22) Filed: Oct. 30, 2001

(65) Prior Publication Data

US 2003/0081145 A1     May 1, 2003

(51) Int. Cl.
*G06K 9/60*     (2006.01)
(52) U.S. Cl. ........................................... 382/305
(58) Field of Classification Search .................. 382/181, 382/305, 306, 229; 707/3; 348/231.2; 358/450
See application file for complete search history.

(56) References Cited

U.S. PATENT DOCUMENTS

| 5,734,893 | A | * | 3/1998 | Li et al. ............................. 707/4 |
| 5,845,278 | A | * | 12/1998 | Kirsch et al. ....................... 707/3 |
| 5,901,244 | A | * | 5/1999 | Souma et al. ................... 382/190 |
| 5,901,245 | A | * | 5/1999 | Warnick et al. ................. 382/190 |
| 6,035,055 | A | * | 3/2000 | Wang et al. ..................... 382/118 |
| 6,236,768 | B1 | * | 5/2001 | Rhodes et al. .................. 382/306 |
| 6,240,423 | B1 | * | 5/2001 | Hirata ........................ 707/104.1 |
| 6,356,921 | B1 | * | 3/2002 | Kumar et al. ................... 715/501.1 |
| 6,389,181 | B2 | * | 5/2002 | Shaffer et al. ................... 382/305 |
| 6,523,046 | B2 | * | 2/2003 | Liu et al. ....................... 707/104.1 |
| 6,757,693 | B2 | * | 6/2004 | Taniguchi et al. .......... 707/104.1 |
| 6,760,491 | B2 | * | 7/2004 | Lange et al. .................... 382/321 |
| 6,877,134 | B1 | * | 4/2005 | Fuller et al. ................. 715/500.1 |
| 6,922,489 | B2 | * | 7/2005 | Lennon et al. ................. 382/228 |
| 7,068,309 | B2 | * | 6/2006 | Toyama et al. ............. 348/231.5 |

FOREIGN PATENT DOCUMENTS

| GB | 2359211 A | 8/2001 |
| WO | WO 01/52178 | 7/2001 |
| WO | WO 02/082328 | 10/2002 |

OTHER PUBLICATIONS

Chang et al., Data Resource Selection in Distributed Visual Information Systems, Nov.-Dec. 1998, IEEE Transactions on Knowledge and Data Engineering, vol. 10, Issue: 6, pp. 926-946.*

(Continued)

*Primary Examiner* — Brian P Werner
*Assistant Examiner* — Dennis Rosario

(57) ABSTRACT

Systems and methods for generating digital images having image meta-data combined with the image data are provided. Briefly described, one of many possible embodiments is an image capture device for generating digital images having image meta-data combined with the image data. The image capture device may comprise image capture hardware configured to capture an image and logic configured for: generating a digital representation of the image, the digital representation comprising image data; applying at least one predefined image analysis algorithm to the digital representation of the image, the at least one predefined image analysis algorithm identifying meta-data corresponding to the image; and combining the meta-data corresponding to the image with the image data to define new image data.

15 Claims, 11 Drawing Sheets

OTHER PUBLICATIONS

Wactlar, Multi-Document Summarization and Visulization in the Informedia Digital Video Library, May 39-31, 2001, New Information Technology 2001 Conference, Tsinghua University, Beijing, pp. 1-7.*

Wactlar, Informedia-Search and Summarization in the Video Medium, Jan. 31-Feb. 2, 2000, Proceedings of Imagina 2000 Conference, Monaco, pp. 1-10.*

Wactlar, New Directions in Video Information Extraction and Summarization, Jun. 24-25, 1999, Proceedings of the 10th DELOS Workshop, Sanorini, Greece,pp. 1-10.*

Currently pending application entitled "System and Method for combining voice annotation and recognition search criteria w ith traditional search criteria into metadata" , Filed: Jun. 4, 2001, U.S. Appl. No. 09/837,687.

* cited by examiner

SYSTEMS AND METHODS FOR GENERATING DIGITAL IMAGES HAVING IMAGE META-DATA COMBINED WITH THE IMAGE DATA

TECHNICAL FIELD

The present invention is generally related to capturing, storing, and displaying digital images, such as still images and video images.

BACKGROUND OF THE INVENTION

Presently, there are a variety of devices configured for capturing an image, such as a still image or a video image, and generating an electronic representation of the image. For instance, video recorders and similar devices are often used to capture video images. Digital cameras, image scanners, and other similar devices are customarily used to capture still images. Any of these devices are typically configured to enable the images to be stored as digital images on the device. These devices generally also enable users to preview the digital images. Such devices may also enable users to download the digital images by manually connecting the device to a personal computer where the digital images may be stored, edited, or transmitted via a communications network to other devices configured for connection to the communications network.

Typically, digital images may be viewed by a variety of image display devices configured for rendering and displaying the digital images, such as, for example, a personal computer (PC), a personal digital assistant (PDA), a WebTV® receiver, a network-enabled digital picture frame 126, such as a Cieva® Digital Picture Frame or a Kodak® Smart Picture Frame, and/or a printer to name a few. With this ability to capture, store, display, and transmit a numerous digital images, searching for and identifying specific digital images based on the content of the image is problematic. For instance, a user may desire to identify a particular digital image based on the contents of the image. Typically, a user is limited to identifying specific images based on the file name associated with the digital image. Although a user may search through a collection of digital images and preview each for the specific content of the image, this technique may be very time consuming and bothersome.

SUMMARY OF THE INVENTION

The present invention provides systems and methods for generating digital images having image meta-data combined with the image data.

Briefly described, one of many possible embodiments is an image capture device for generating digital images having image meta-data combined with the image data. The image capture device may comprise image capture hardware configured to capture an image and logic configured for: generating a digital representation of the image, the digital representation comprising image data; applying at least one predefined image analysis algorithm to the digital representation of the image, the at least one predefined image analysis algorithm identifying meta-data corresponding to the image; and combining the meta-data corresponding to the image with the image data to define new image data.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF A PREFERRED EMBODIMENT

I. Working Environment

Figure 1:
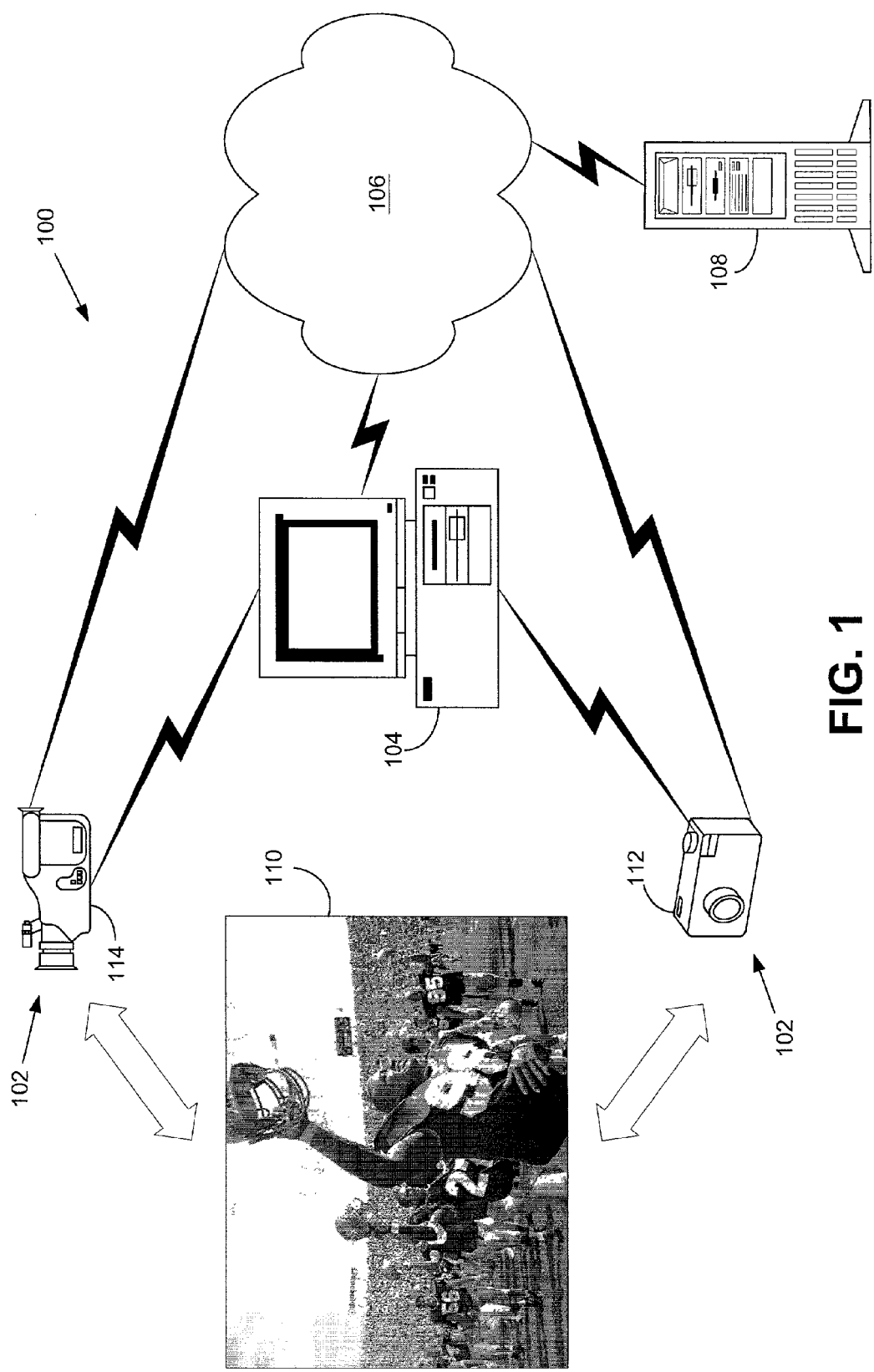
FIG. 1 is a schematic diagram illustrating a composite of several possible embodiments of a system for generating digital image files having meta-data according to the present invention.

FIG. 1 illustrates a system 100 for generating digital image files having meta-data combined with the image data. System 100 may comprise image capture device(s) 102, a computing device 104, a communications network 106, and a network device 108.

Image capture device(s) 102 may be any of a variety of devices that are configured to capture an image 110. For example, image capture device(s) 102 may be a device, such as a digital camera 112, a scanner, a facsimile machine, or other device configured to capture a still image. Image capture device(s) 102 may also be a device, such a video recorder 114, configured to capture real-time video images. As one of ordinary skill in the art will understand, image capture device(s) 102 may also be any other type of device that is configured to capture still images and/or real-time video images. Image capture device(s) 102 may also be configured to communicate directly with a computing device 104, such as a personal computer (PC), laptop computer, or any other computing device. Furthermore, image capture device(s) 102 may be configured to communicate via communications network 106 with a network device 108 or any other device connected to communications network 106.

Communications network 106 may be any type of communication network employing any network topology, transmission medium, or network protocol. For example, communications network 106 may be a local area network (LAN), a metropolitan area network (MAN), a wide area network (WAN), any public or private packet-switched or other data network, including the Internet, circuit-switched networks, such as the public switched telephone network (PSTN), wireless networks, optical networks, or any other desired communications infrastructure.

As will be understood by one of ordinary skill in the art, the precise configuration of each of the computing devices 104, communications network 106, and image capture device(s) 102 is not critical. Rather, computing devices 104, communications network 106, and image capture device(s) 102 may be configured in a variety of ways, in accordance with the present invention, for generating a digital image file of an image, such as a still image and/or a video image, which contains (1) information corresponding to a digital representation of the image and (2) image meta-data associated with the image. As described in detail below, various aspects of the functionality for generating a digital image containing meta-data combined with the image data may be implemented by image capture device(s) 102, computing devices 104, and/or network devices 108.

II. Image Capture Device

Figure 2:
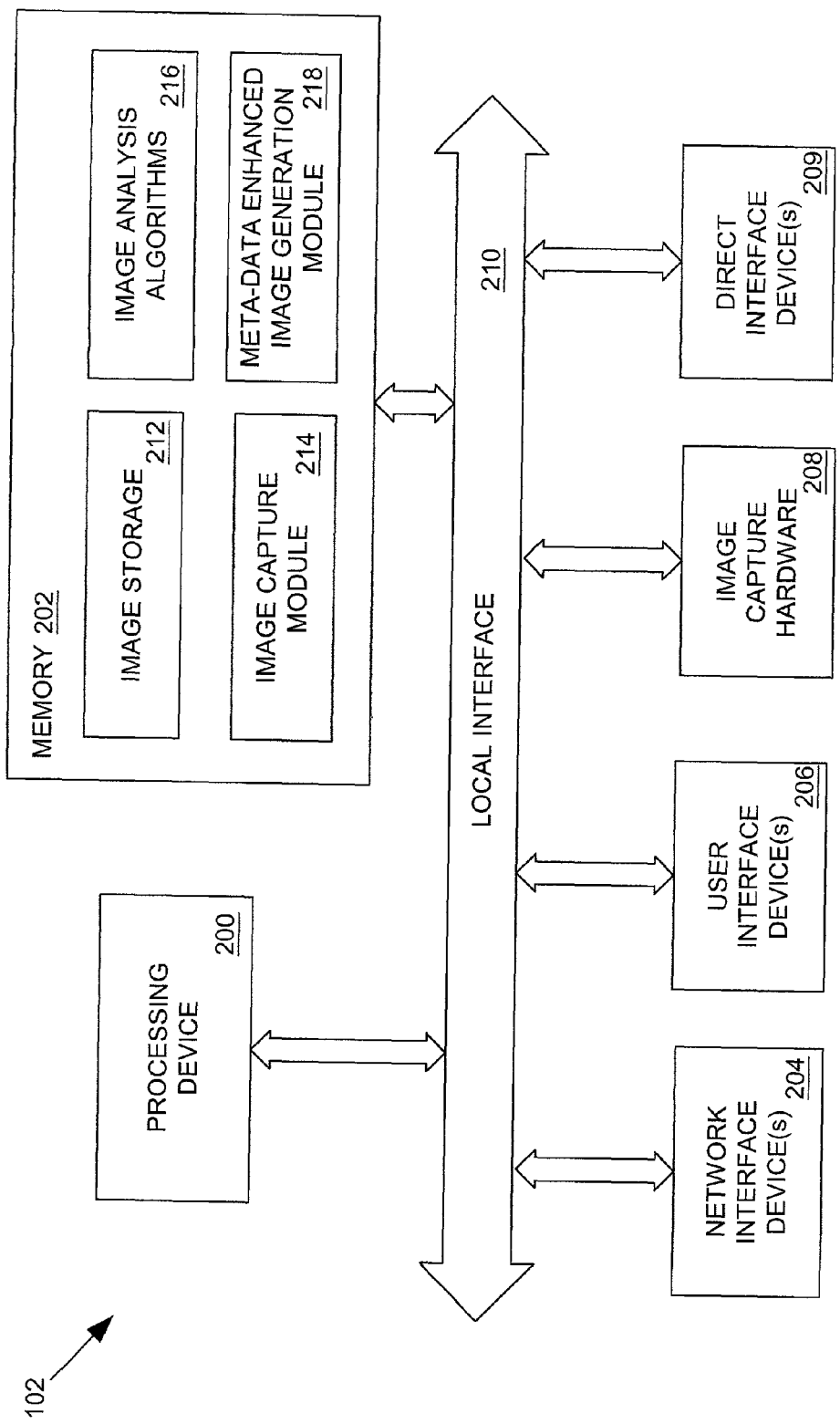
FIG. 2 is a schematic diagram of an embodiment of an image capture device of FIG. 1 according to the present invention.

FIG. 2 illustrates a schematic diagram of one of a number of possible embodiments of an image capture device 102 according to the present invention for generating digital image files having meta-data combined with the image data. As stated above, image capture device 102 may be any of a variety of devices that are configured to capture an image, such as a still image or a real-time video image. Image capture device 102 may comprise a processing device 200, memory 202, one or more network interface devices 204, one or more user interface devices 206, image capture hardware 208, and interface device(s) 209 interconnected via local interface 210. Memory 202 may comprise image storage 212, an image capture module 214, one or more image analysis algorithms 216, and a meta-data enhanced image generation module 218.

Local interface 210 may be, for example but not limited to, one or more buses or other wired or wireless connections, as known in the art. Local interface 210 may include address, control, and/or data connections to enable appropriate communications among processing device 200, memory 202, network interface devices 204, user interface devices 206, image capture hardware 208, and interface devices 209. Memory 202 may comprise an image storage 212, image capture module 214, one or more image analysis algorithms 216, an meta-data enhanced image generation module 218. Processing device 200 may be generally any device for executing software and is shown as optionally located in memory 202, such as image capture module 214, image analysis algorithms 216, and meta-data enhanced image generation module 218.

User interface device(s) 206 may comprise one or more function keys with which the operation of the image capture device 102 can be controlled by a user. User interface device(s) 206 may also comprise a liquid crystal display (LCD) or other similar display for facilitating the interaction between the user and image capture device 102. Furthermore, user interface device(s) 206 may comprise a display for previewing the images captured by the device. Image capture hardware 208 may comprise the components for capturing image 110, generating a digital representation of image 110, and storing the image data in image database 212. As understood by one of ordinary skill in the art, image capture device 102 may further comprise any of a number of other components not illustrated in FIG. 2.

Interface device(s) 209 may be configured to facilitate direct communication with a variety of devices, such as, for example, computing device 104. Thus, interface device(s) 209 may comprise a data transmitting device and a data receiving device for providing wired and/or wireless communication between image capture device 102 and computing device 104.

Network interface device(s) 204 may be configured to facilitate communication with network device 108 or any other device connected to communications network 106. Thus, network interface device(s) 204 may comprise device(s) for providing wired and/or wireless communication between image capture device 102 and communication network 106.

Image capture module 214, image analysis algorithm(s) 216, and meta-data enhanced image generation module 218 may be implemented in hardware, software, firmware, or a combination thereof. As illustrated in FIG. 2, in one of a number of possible embodiments, image capture module 214, image analysis algorithm(s) 216, and meta-data enhanced image generation module 218 are implemented in software or firmware that is stored in memory 202 and that is executed by processing device 200 or any other suitable instruction execution system. If implemented in hardware, as in alternative embodiments, image capture module 214, image analysis algorithm(s) 216, and meta-data enhanced image generation module 218 may be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Image capture module 214 comprises logic configured to cooperate with image capture hardware 208 for capturing image 110, generating a digital representation of image 110, and storing the image data in image database 212. Image capture module 214 may also comprise logic configured for displaying and/or manipulating the image data, as well as other logic for performing any of a variety of other functions associated with image capture device 102.

Figure 3:
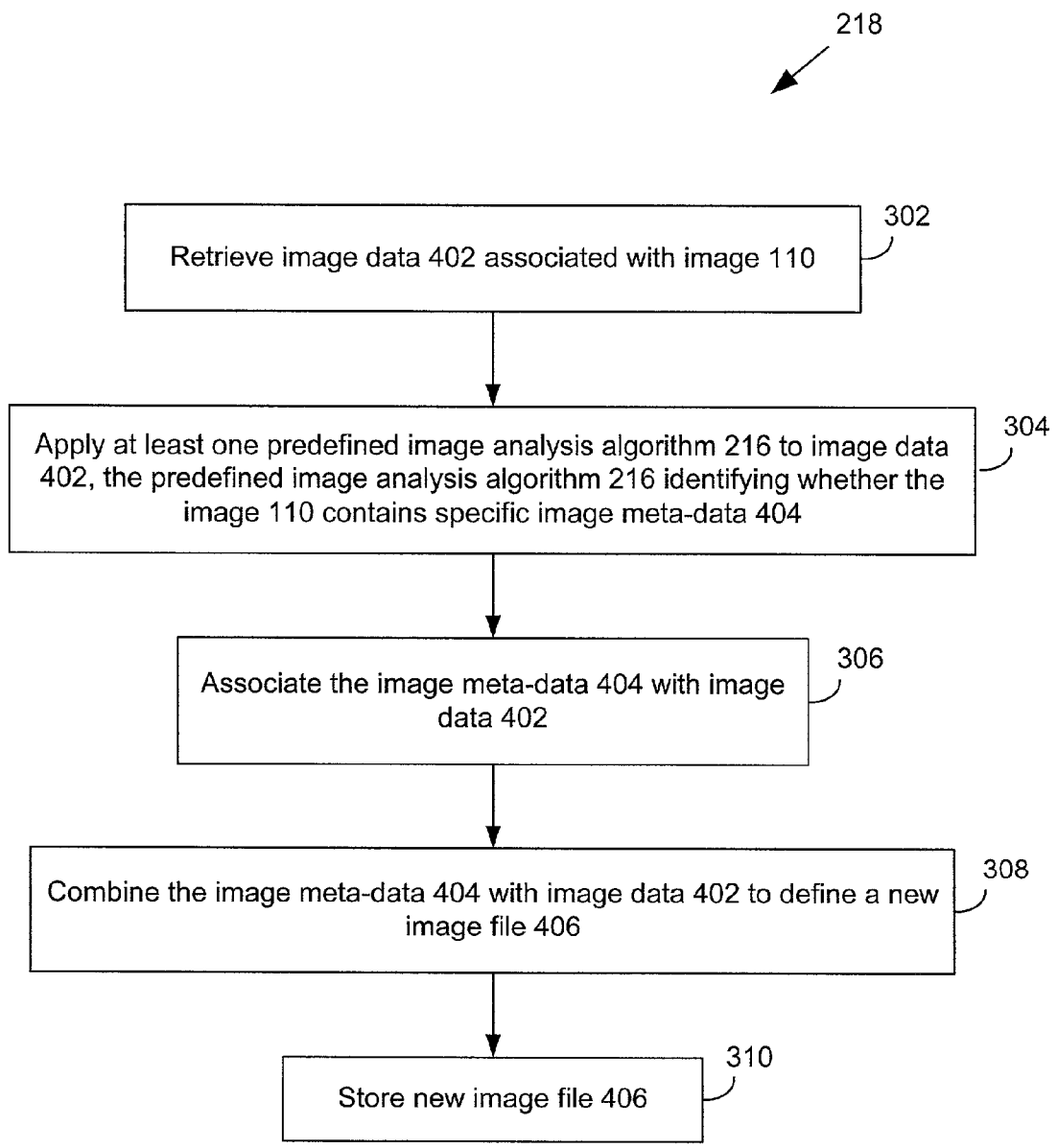
FIG. 3 is a flow diagram illustrating the architecture, operation, and/or functionality of an embodiment of the meta-data enhanced image generation module of the image capture device of FIG. 2 according to the present invention.
Figure 4:
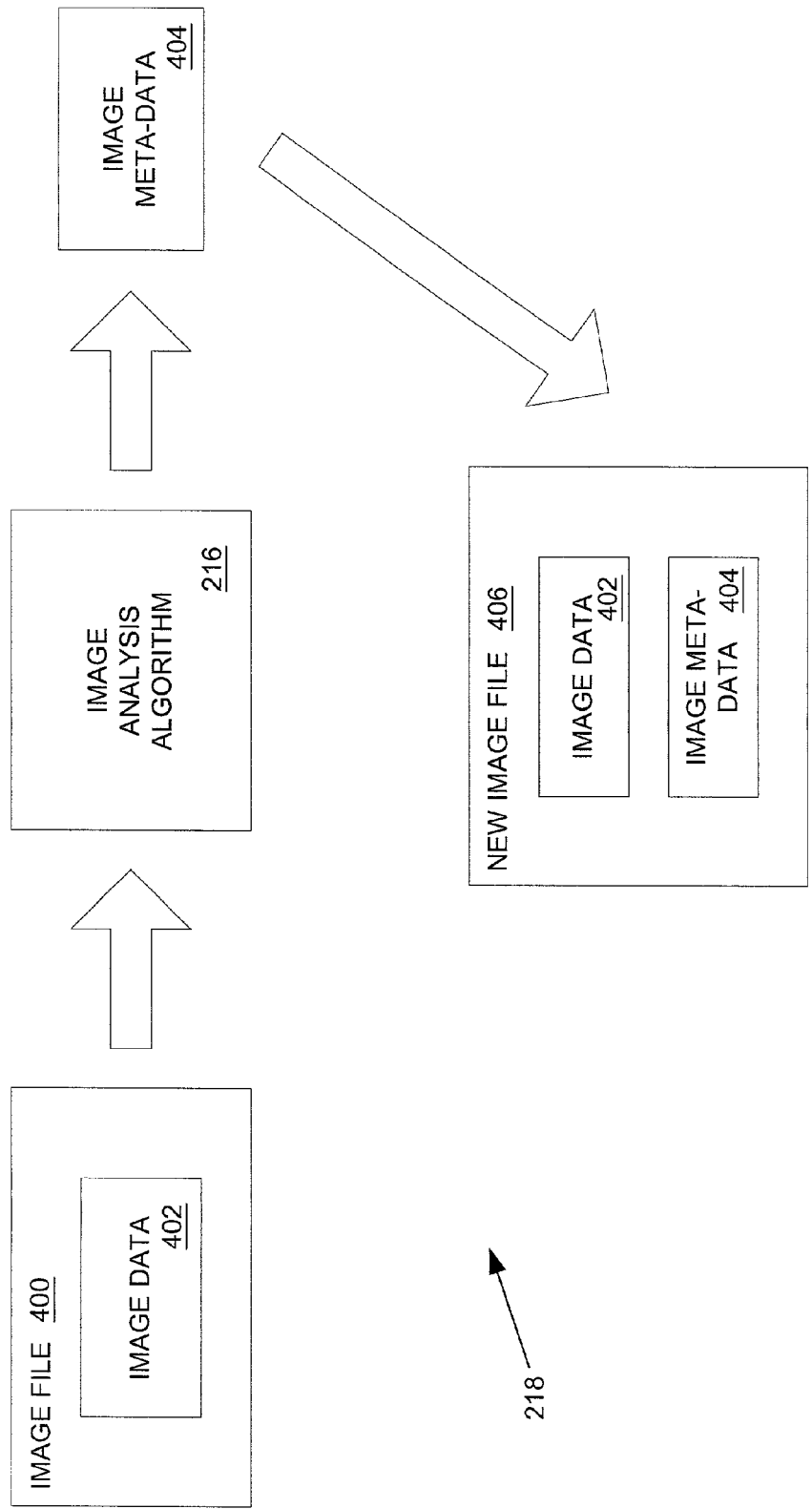
FIG. 4 is a flow diagram illustrating the operation of an embodiment of a predefined image analysis algorithm of the image capture device of FIG. 2 according to the present invention.

FIG. 3 is a flow diagram illustrating the architecture, operation, and/or functionality of one of a number of possible embodiments of meta-data enhanced image generation module 218 according to the present invention for generating a digital image of image 110, which contains meta-data combined with the image data. Meta-data enhanced image generation module 218 may begin operation after image capture module 214 captures image 110, generates a digital representation of image 110, and stores the image data in image storage 212. The digital representation of image 110, which comprises image data 402 (FIG. 4), may be stored in image storage 212 as an image file 400 (FIG. 4). Image data 402 may be in any of the following, or other, image formats: TIFF, JPEG, GIF, BMP, EXIF, and FlashPix.

At block 302, meta-data enhanced image generation module 218 retrieves image data 402 associated with image 110. At block 304, meta-data enhanced image generation module 218 applies one, all, or a combination of a variety of predefined image analysis algorithms 216 to image data 402 associated with image 110. Image data 402 may be retrieved in a variety of ways. Typically, image data 402 may be retrieved directly from image storage 212 when meta-data enhanced image generation module 218 is initiated. However, in alternative embodiments, image data 402 may be provided directly to meta-data enhanced image generation module 218 by image capture module 214 before, or at the same time, it is stored image storage 212.

As illustrated generally in FIG. 4, predefined image analysis algorithm 216 is configured to identify specific image meta-data 404 corresponding to image 110 and image data 402. Referring to FIGS. 3 and 4, at block 306, meta-data enhanced image generation module 218 associates image meta-data 404 corresponding to image 110 with image data 402. At block 308, meta-data enhanced image generation module 218 combines image meta-data 404 corresponding to image 110 with image data 402 to define a new image file 406. In other words, predefined image analysis algorithm 216 analyzes image data 402 and extracts specific information, referred to as meta-data, about image 110. Prior to the application of a predefined image analysis algorithm 216 to image data 402, there is no way of determining whether image 110 contains the specific image meta-data 404. As described in detail below, by combining image meta-data 404 with image data 402, a plurality of new image files 406 may be quickly searched to locate a desired image file containing specific image meta-data 404. At block 310, meta-data enhanced image generation module 218 may store new image file 406. Image file 406 may be stored in image storage 212 or at some other location in memory 202.

Although meta-data enhanced image generation module 218 has been described with respect to a single predefined image analysis algorithm 216, it will be appreciated that image capture device 102 may be configured with any number of unique predefined image analysis algorithms 216. In fact, it may be particularly advantageous to apply as many predefined image analysis algorithms 216 as possible to image data 402. In this manner, as much information as possible may be extracted from image 110 associated with image data 402, and combined as new image file 406. Furthermore, one of ordinary skill in the art will understand that each predefined image analysis algorithm 216 may be configured to extract any type of information from image 110. For example, a predefined image analysis algorithm 216 may be configured to extract key frame information from video images. Another predefined image analysis algorithm 216 may be configured to employ face recognition vectors to identify the presence of a particular person in image 110. Another predefined image analysis algorithm 216 may be configured to identify particular scene content attributes in image 110, such as, for example, texture, color, and specific objects. As additional examples, predefined image analysis algorithms 216 may be configured to identify location recognition information and voice recognition vectors (video images). It should also be appreciated that new image file 406 may be used to store other types of information about image data 402, which need not be extracted by a predefined image analysis algorithm 216. For example, image meta-data 404 may also include any of the following, or other, types of information: information about the person using image capture device 102, the date and time image 110 was captured, and information about the location where image 110 was captured. These types of information may be manually input by a user via user interface device 206 and stored as image meta-data 404 by meta-data enhanced image generation module 218.

III. Computing Device

Figure 5:
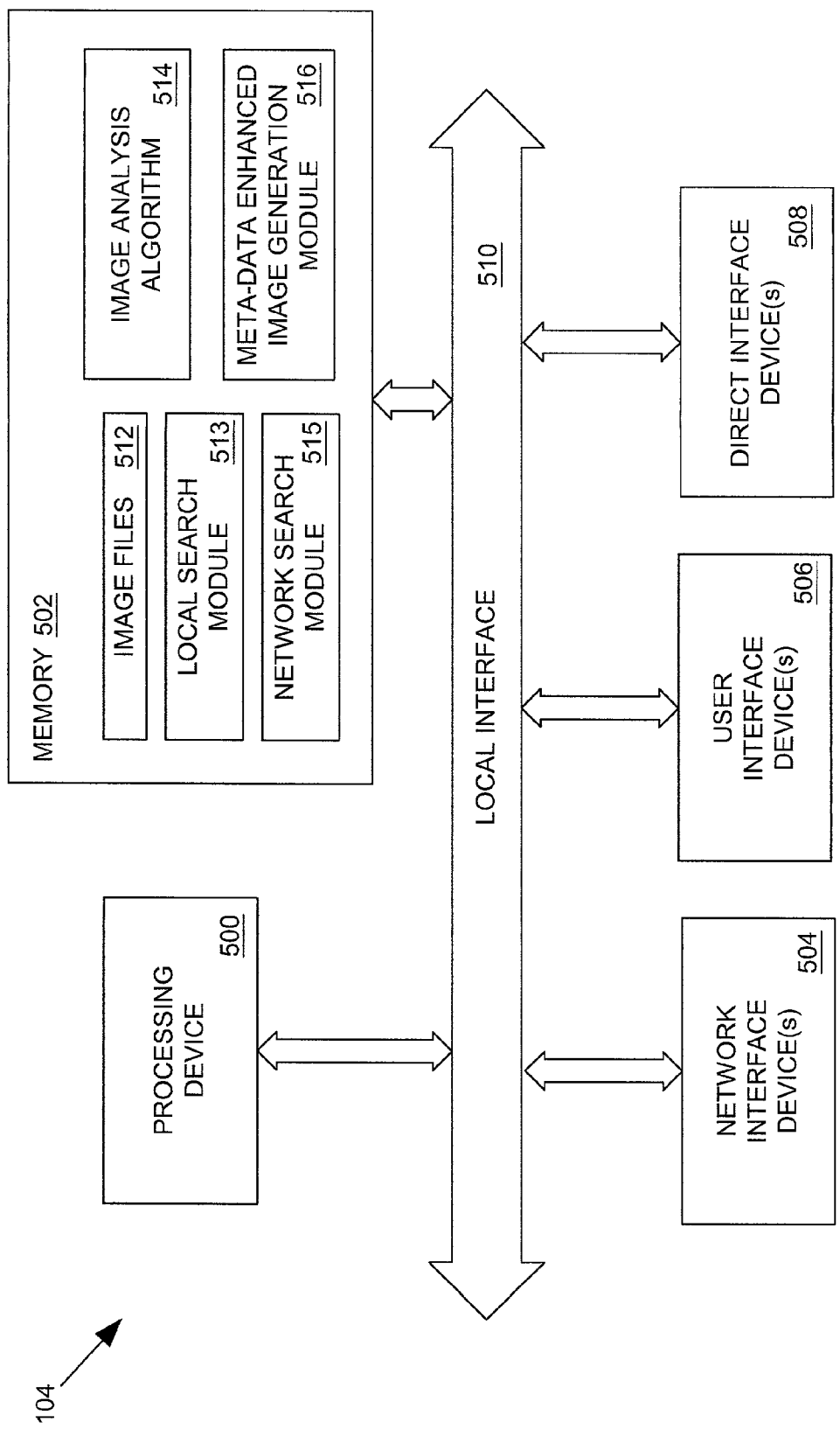
FIG. 5 is a schematic diagram of an embodiment of the computing device of FIG. 1 according to the present invention.

As mentioned above, the functionality for generating a digital image containing meta-data combined with image data may also be implemented by a computing device 104 in communication with image capture device 102. FIG. 5 illustrates a schematic diagram of one of a number of embodiments of a computing device 104 for generating digital image files having meta-data combined with image data according to the present invention.

Computing device 104 may comprise a processing device 500, memory 502, one or more network interface devices 504, one or more user interface devices 506, and direct interface device(s) 509 interconnected via local interface 510. Memory 502 may comprise a plurality of image files 512, one or more predefined image analysis algorithms 514, a meta-data enhanced image generation module 516, a local search module 513, and a network search module 515.

Local interface 510 may be, for example but not limited to, one or more buses or other wired or wireless connections, as known in the art. Local interface 510 may comprise additional elements, which are omitted for simplicity, such as controllers, buffers (caches), drivers, repeaters, and receivers, to enable communications. Further, local interface 510 may include address, control, and/or data connections to enable appropriate communications among processing device 500, memory 502, network interface devices 504, user interface devices 506, and direct interface devices 508.

Memory 502 may include any one or combination of volatile memory elements (e.g., random access memory (RAM, such as DRAM, SRAM, SDRAM, etc.)) and nonvolatile memory elements (e.g., ROM, hard drive, tape, CDROM, etc.). Memory 502 may incorporate electronic, magnetic, optical, and/or other types of storage media. Memory 502 may also have a distributed architecture, where various components are situated remote from one another, but may be accessed by the processing device 500. Memory 502 may comprise a one or more image files 512, local search module 513, network search module 515, one or more image analysis algorithms 514, and meta-data enhanced image generation module 516.

Processing device 500 may be a hardware device for executing software located in memory 502. Processing device 500 may be any custom made or commercially available processor, a central processing unit (CPU), a semiconductor based microprocessor (in the form of a microchip or chip set), a macroprocessor, or generally any device for executing software instructions.

User interface device(s) 506 may comprise typical user interface devices, such as a keyboard, mouse, computer monitor, or other interface device, for facilitating interaction between the user and computing device 104 and/or for previewing the plurality of image files 512.

Network interface device(s) 504 may be configured to facilitate direct communication with any of a variety of image capture device(s) 102. Thus, network interface device(s) 504 may comprise device(s) for providing wired and/or wireless communication between image capture device 102 and computing device 104.

Network interface device(s) 504 may be configured to facilitate communication with network device 108 or any other device connected to communications network 106. Thus, network interface device(s) 504 may comprise a device (s) for providing wired and/or wireless communication between image computing device 504 and communication network 106.

Figure 6:
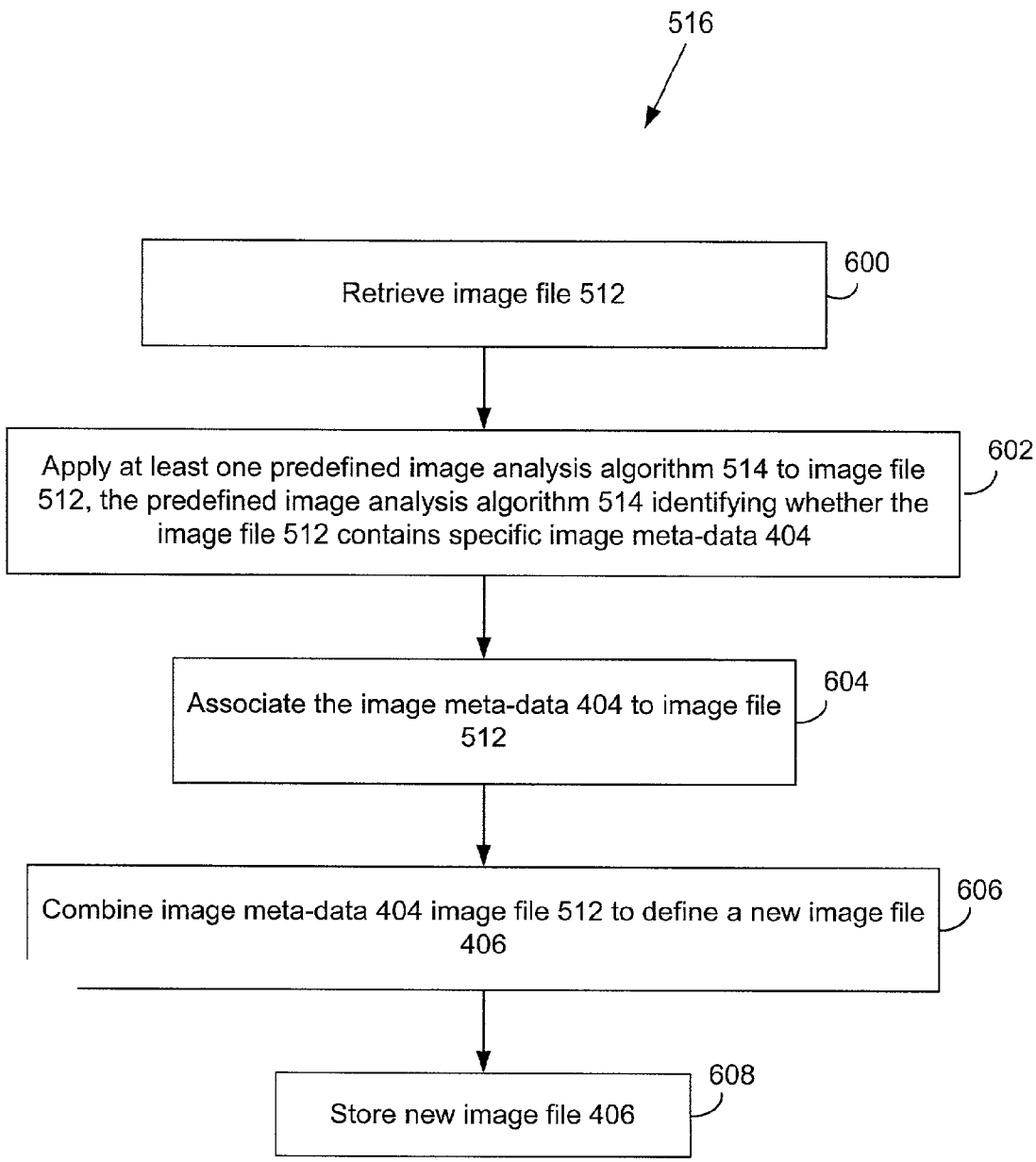
FIG. 6 is a schematic diagram of an embodiment of the meta-data enhanced image generation module of the computing device of FIG. 5 according to the present invention.

Image analysis algorithm(s) 514, meta-data enhanced image generation module 516, local search module 513, and network search module 515 may be implemented in hardware, software, firmware, or a combination thereof. As illustrated in FIG. 5, in one of a number of possible embodiments, image analysis algorithm(s) 514, meta-data enhanced image generation module 516, local search module 513, and network search module 515 are implemented in software or firmware that is stored in memory 502 and that is executed by processing device 500 or any other suitable instruction execution system. If implemented in hardware, as in alternative embodiments, image analysis algorithm(s) 514, meta-data enhanced image generation module 516, local search 513, and network search 515 may be implemented with any or a combination of now known or later developed technologies capable of carrying out the functionality described herein FIG. 6 is a flow diagram illustrating the architecture, operation, and/or functionality of one of a number of possible embodiments of meta-data enhanced image generation module 516 according to the present invention for generating a digital image file, which contains meta-data combined with the image data. Meta-data enhanced image generation module 516 may be configured in the same manner as meta-data enhanced image generation module 218 in image capture device 102. In certain embodiments, meta-data enhanced image generation module 516 may be used on images 110 received from image capture device 102 via direct interface device 508. In other embodiments, meta-data enhanced image generation module 516 may be used on image files 512.

Although either embodiment may be employed, meta-data enhanced image generation module 516 will be described hereafter with respect to image files 512. At block 600, meta-data enhanced image generation module 600 retrieves image file 512. At block 602, meta-data enhanced image generation module 516 applies one, all, or a combination of a variety of predefined image analysis algorithms 514 to image file 512 to identify image meta-data 404 corresponding to image file 512. Predefined image analysis algorithms 514 may be configured in the same manner as predefined image analysis algorithms 216 in image capture device 102. Referring to FIGS. 4 and 6, at block 604, meta-data enhanced image generation module 516 associates the image meta-data 404 with image file 512. At block 606, meta-data enhanced image generation module 516 combines image meta-data 404 with image file 512 to define a new image file 406.

IV. Searching for Specific Image Meta-Data

As mentioned above, by combining image meta-data 404 with image 512, a plurality of new image files 406 may be quickly searched to locate a desired image file containing specific image meta-data 404. For instance, computing device 104 may be further configured with a local search module 513 to enable a user to search the new image files 406 located in memory 502 for an image file containing specific image meta-data 404. New image files 406 may be stored with image files 512 or in some other location in memory 502.

Figure 7:
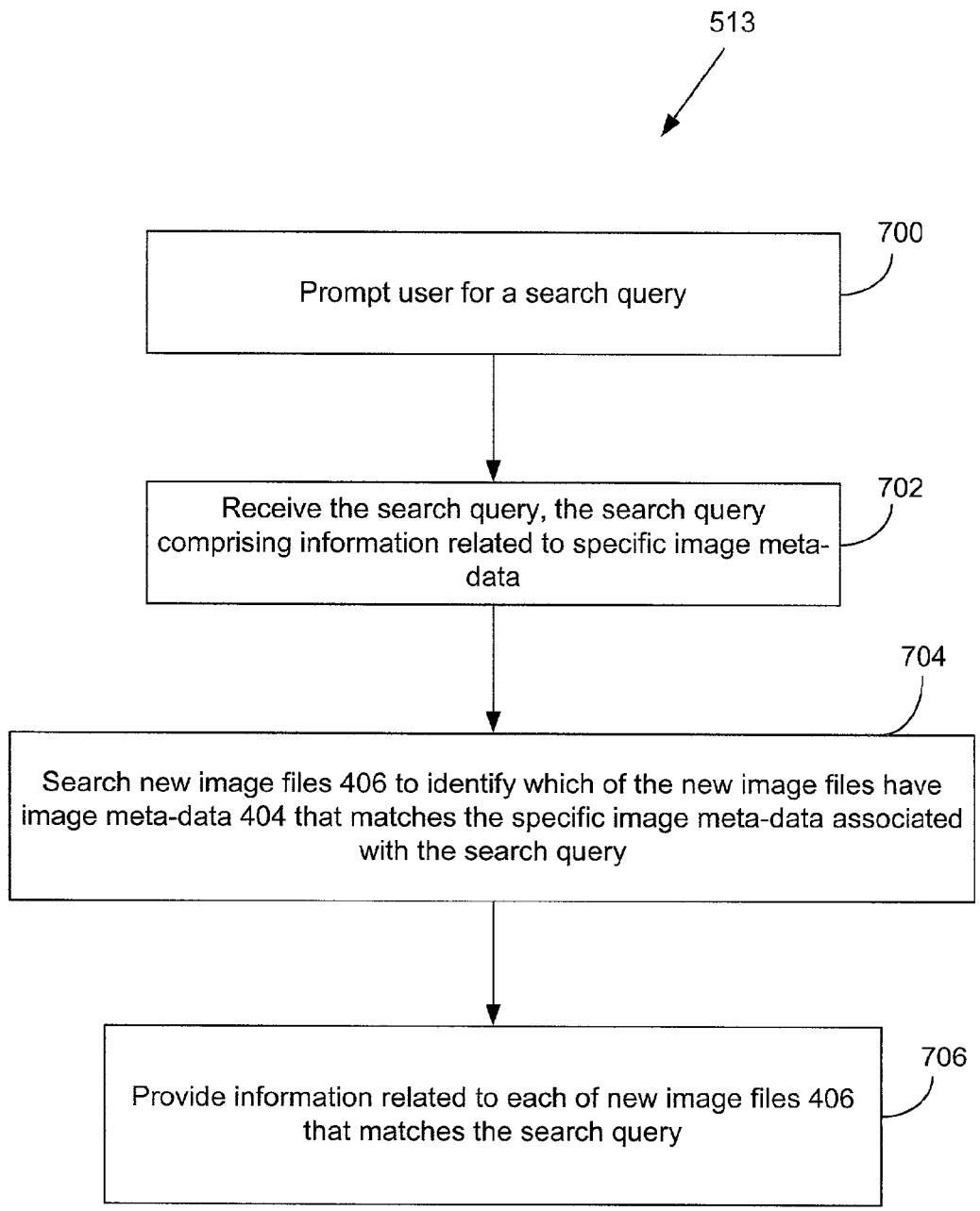
FIG. 7 is a flow diagram illustrating the architecture, operation, and/or functionality of one of an embodiment of the local search module of the computing device of FIG. 5 according to the present invention.

FIG. 7 is a flow diagram illustrating the architecture, operation, and/or functionality of one of a number of possible embodiments of local search module 513 according to the present invention for performing such a search. At block 700, local search module 513 prompts a user on user interface device 506 for a search query. At block 702, local search module receives the search query from user interface device 506. The search query may comprise information related to a specific image meta-data that the user desires to find. At block 704, local search module 513 searches new image files 406 to identify which of the new image files 406 have image meta-data 404 that matches the specific image meta-data associated with the search query. At block 708, local search module 513 may provide, on user interface device 506, information related to each of new image files 406 that matches the search query. For example, the locations of these files may be presented.

Figure 8:
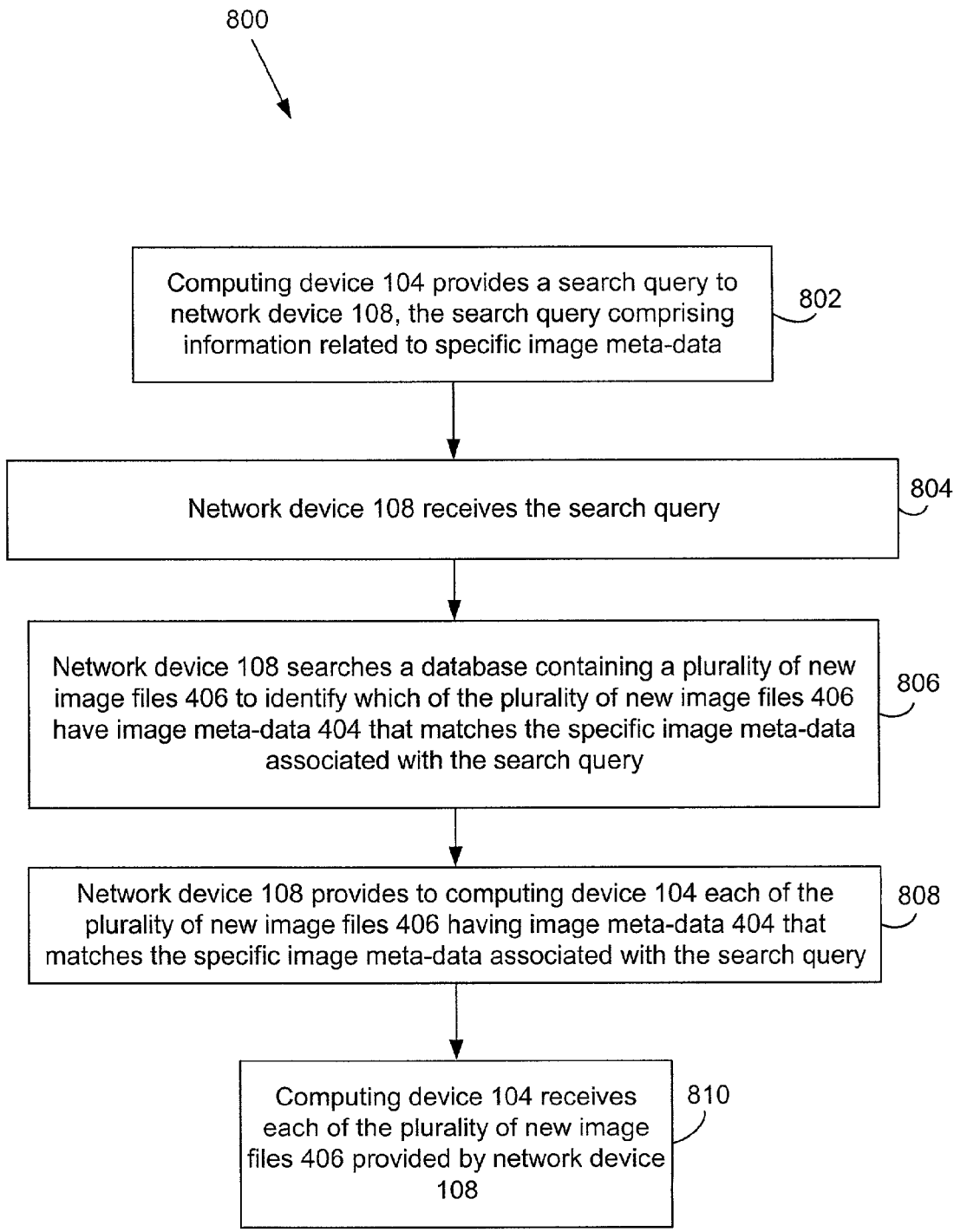
FIG. 8 is a flow diagram illustrating an exemplary interoperation of the computing device and the network device of FIG. 1 for enabling a user to search the network device for specific image meta-data according to the present invention.

In other embodiments, where new image files 406 are located on network device 108, computing device 104 and network device 108 may be configured to enable a user to search network device 108 for image files containing specific image meta-data. As illustrated in the flow diagram of FIG. 8, at block 802 computing device 802 may provide a search query to network device 108. The search query may comprise information related to specific image meta-data the user desires to locate. At block 804, network device 108 receives the search query. At block 806, network device 108 searches a database containing a plurality of new image files 406 to identify which of the plurality of image files 406 have image meta-data 404 that matches the specific image meta-data associated with the search query. At block 808, network device 108 may provide, to computing device 104, each of the plurality of new image files 406 that matches the specific image meta-data associated with the search query. At block 810, computing device 104 receives each of the plurality of new image files that satisfy the search query.

Figure 9:
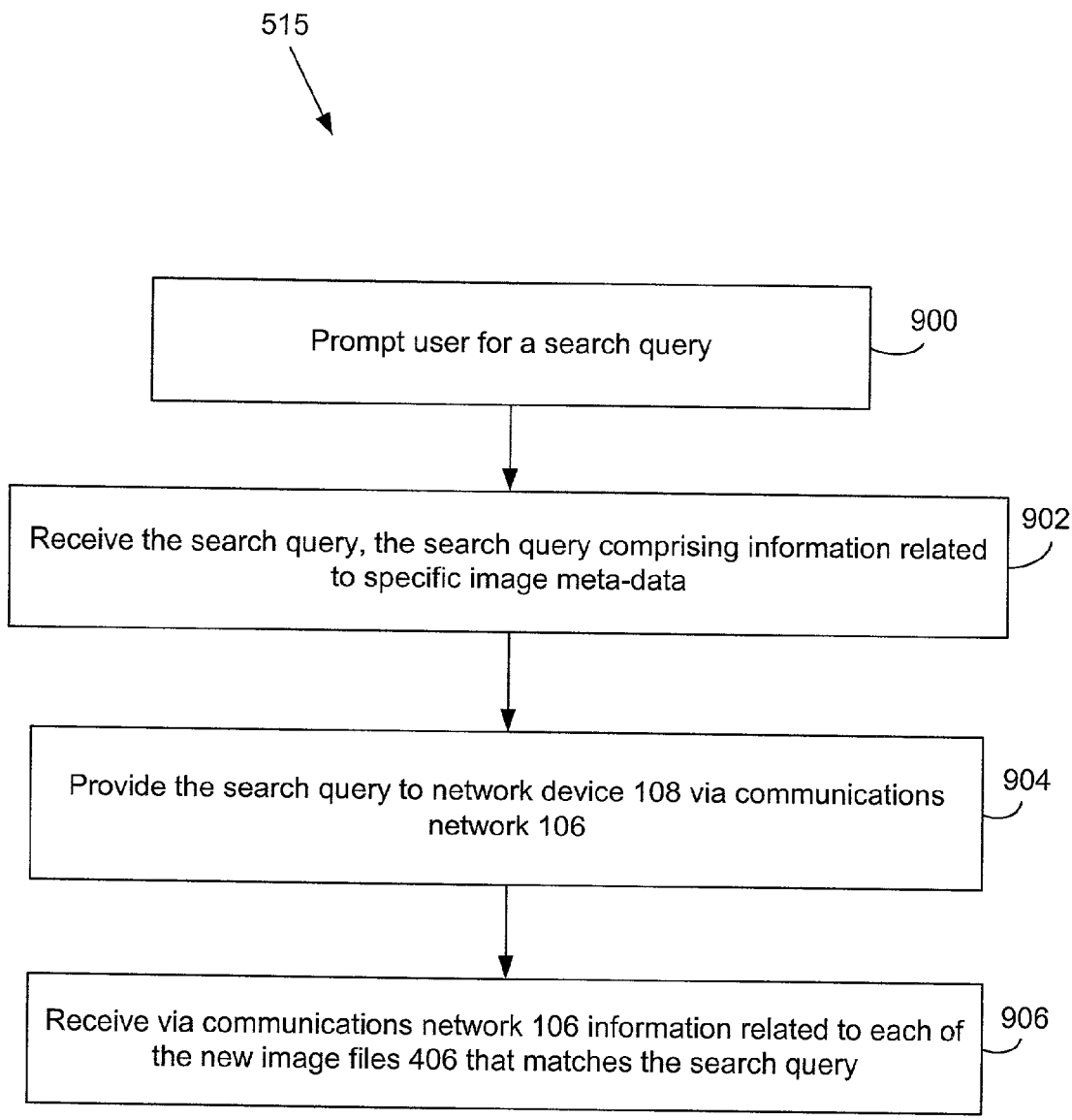
FIG. 9 is a flow diagram illustrating the architecture, operation, and/or functionality of an embodiment of the network search module of FIG. 5 according to the present invention.

In order to enable the user to search network device 108, computing device 104 may be configured with a network search module 515. FIG. 9 is a flow diagram illustrating the architecture, operation, and/or functionality of one of a number of possible embodiments of network search module 515 according to the present invention for performing a search of network device 108. At block 900, network search module 515 prompts the user on user interface device 506 for a search query. At block 902, network search module 515 receives the search query from user interface device 506. The search query may comprise information related to specific image meta-data that the user desires to find on network device 108. At block 904, network search module 515 may provide the search query to network device 108 via communications network 106. At block 906, network search module 515 may receive via communications network 106 information related to each of the new image files 406 that matches the search query. For example, network search module 515 may receive the matching new image files 406. Network search module 515 may also be configured to enable the user to select which of the new image files to receive.

IV. Network Device

Figure 10:
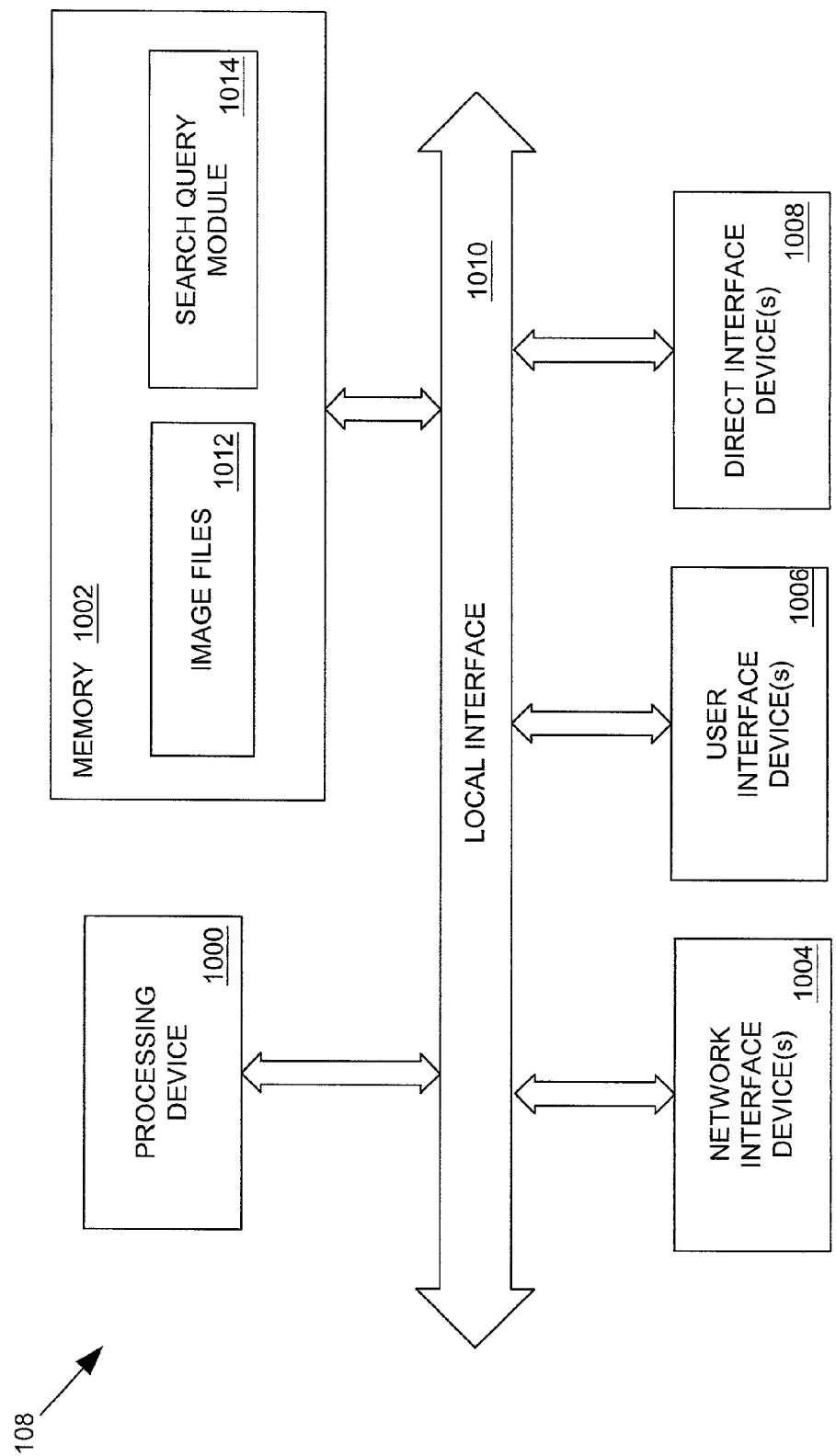
FIG. 10 is a schematic diagram illustrating an embodiment of the network device of FIG. 1 according to the present invention.

FIG. 10 illustrates a schematic diagram of one of a number of embodiments of a network device 108 for enabling a user of a computing device 104 to search network device 108 for image files containing specific image meta-data. Network device 108 may comprise a processing device 1000, memory 1002, one or more network interface devices 1004, and one or more user interface devices 1006 interconnected via local interface 1010.

Local interface 1010 may be, for example but not limited to, one or more buses or other wired or wireless connections, as known in the art. Local interface 1010 may comprise additional elements, which are omitted for simplicity, such as controllers, buffers (caches), drivers, repeaters, and receivers, to enable communications. Further, local interface 1010 may include address, control, and/or data connections to enable appropriate communications among processing device 1000, memory 1002, network interface devices 1004, user interface devices 1006, and direct interface devices 1008.

Memory 1002 may include any one or combination of volatile memory elements (e.g., random access memory (RAM, such as DRAM, SRAM, SDRAM, etc.)) and nonvolatile memory elements (e.g., ROM, hard drive, tape, CDROM, etc.). Memory 1002 may incorporate electronic, magnetic, optical, and/or other types of storage media. Memory 1002 may also have a distributed architecture, where various components are situated remote from one another, but may be accessed by the processing device 1000. Memory 1002 may comprise a one or more image files 1012 and search query module 1014.

Processing device 1000 may be a hardware device for executing software located in memory 1002. Processing device 1000 may be any custom made or commercially available processor, a central processing unit (CPU), a semiconductor based microprocessor (in the form of a microchip or chip set), a macroprocessor, or generally any device for executing software instructions.

Network interface device(s) 1004 may be configured to facilitate communication with computing device 104 or any other device connected to communications network 106. Thus, network interface device(s) 1004 may comprise device(s) for providing wired and/or wireless communication between network device 108 and communication network 106.

Search query module 1014 may be implemented in hardware, software, firmware, or a combination thereof. As illustrated in FIG. 10, in one of a number of possible embodiments, search query module 1014 is implemented in software or firmware that is stored in memory 1002 and that is executed by processing device 1000 or any other suitable instruction execution system. If implemented in hardware, as in alternative embodiments, search query module 1014 may be implemented with any or a combination of now known or later developed technologies capable of carrying out the functionality described herein.

Figure 11:
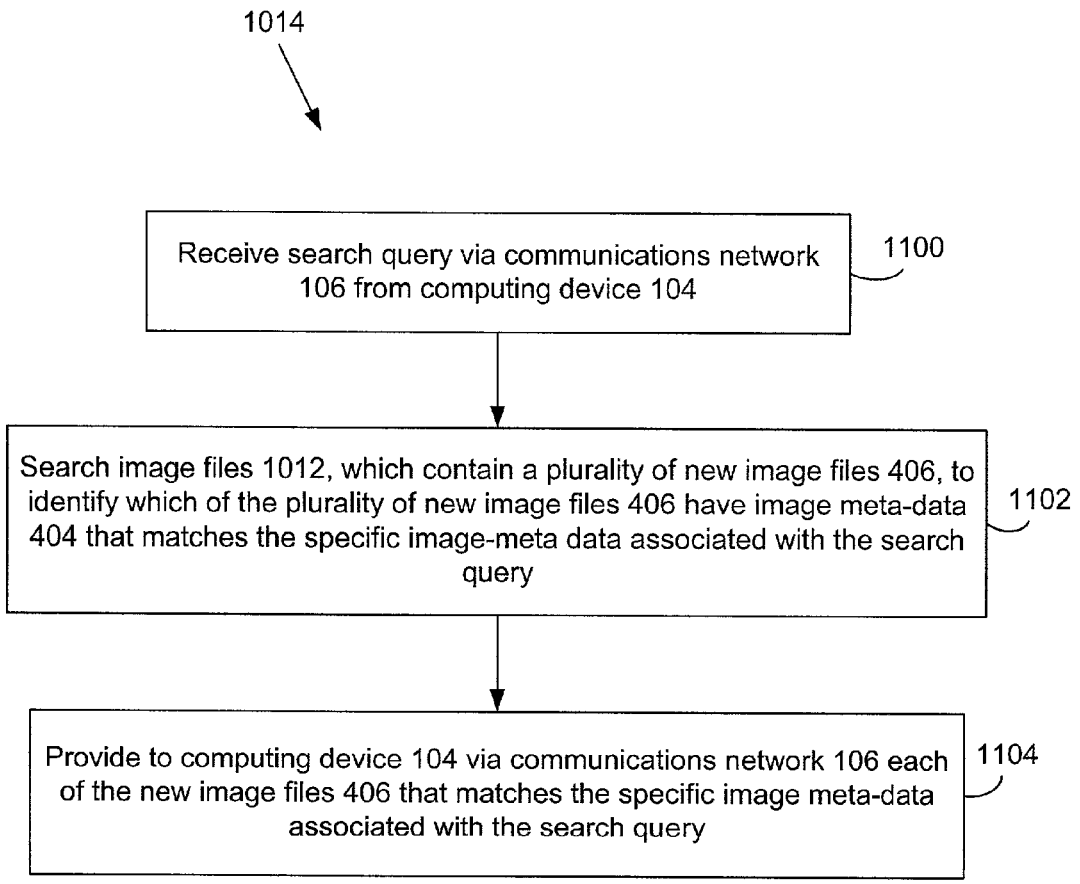
FIG. 11 is a flow diagram illustrating the architecture, operation, and/or functionality of an embodiment of the search query module of the network device of FIG. 10 according to the present invention.

FIG. 11 is a flow diagram illustrating the architecture, operation, and/or functionality of one of a number of possible embodiments of search query module 1014 according to the present invention for enabling a user of a computing device 104 to search network device 108 for image files containing specific image meta-data. At block 1100, search query module 1014 receives a search query via communications network 106 from computing device 104. The search query may comprise information related to specific image meta-data that the user desires to find on network device 108. At block 1102, network device 108 searches a image files 1012 containing a plurality of new image files 406 to identify which of the plurality of image files 406 have image meta-data 404 that matches the specific image meta-data associated with the search query. At block 1104, network device 108 may provide, to computing device 104 via communications network 106, each of the plurality of new image files 406 that matches the specific image meta-data associated with the search query.

Meta-data enhanced image generation module 218 (FIG. 3) and 516 (FIG. 6), local search module 513 (FIG. 7), network search module 515 (FIG. 9), and search query module 1014 (FIG. 11), may each comprise an ordered listing of executable instructions for implementing logical functions and may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

We claim:

1. An image file embodied in a non-transitory computer-readable medium, comprising:
   digital image data that represents an image; and
   image meta-data associated with the digital image data created by applying a predefined image analysis algorithm to the digital image data to identify within the image a recognized location at which the image was captured.

2. The image file of claim 1, wherein the image meta-data comprises at least one searchable keyword.

3. An image capture device, comprising:
   image capture hardware configured to capture an image; and
   logic configured for:
      generating a digital representation of the image, the digital representation comprising image data;
      applying at least one predefined image analysis algorithm to the digital representation of the image to identify within the image a recognized location at which the image was captured, the at least one predefined image analysis algorithm generating image meta-data corresponding to the recognized location; and
      combining the image meta-data corresponding to the recognized location with the image data to define new image data.

4. The image capture device of claim 3, wherein the logic is software and further comprising a processing device for implementing the logic.

5. The image capture device of claim 3, wherein the logic is further configured for storing the new image data.

6. The image capture device of claim 3, further comprising a network interface device configured for communication with a communications network and wherein the logic is further configured for providing the new image data to the communications network.

7. The image capture device of claim 3, further comprising an interface configured for direct communication with a computer and wherein the logic is further configured for providing the new image data to the computer.

8. The image capture device of claim 3, wherein the image meta-data comprises at least one searchable keyword.

9. The image capture device of claim 3, wherein the image capture device is a digital camera.

10. A method for generating an image file containing meta-data, the method comprising:
- identifying a digital representation of an image, the digital representation comprising image data;
- applying at least one predefined image analysis algorithm to the digital representation of the image to identify within the image a recognized location at which the image was captured, the at least one predefined image analysis algorithm generating meta-data corresponding to the recognized location; and
- combining the meta-data corresponding to the recognized location with the image content data to define new image data.

11. The method of claim 10, wherein the meta-data comprises at least one searchable keyword.

12. The method of claim 10, wherein identifying a digital representation of the image involves receiving the image data.

13. A method for searching image files having specific image meta-data, the method comprising:
- receiving a search query comprising information related to specific image meta-data;
- based on the search query, searching one or more image files for the image meta-data specified in the search query, the image meta-data having been generated by applying a predefined image analysis algorithm to a digital representation of an image to identify within the image a recognized location at which the image was captured; and
- identifying one or more of the image files that comprise image meta-data that matches the image meta-data specified in the search query.

14. The method of claim 13, further comprising providing the one or more image files that match the specific image meta-data in the search query.

15. The method of claim 13, wherein the image meta-data and the search query comprises at least one searchable keyword.

* * * * *